United States Patent Office 3,787,467
Patented Jan. 22, 1974

3,787,467
PERFLUORO - ALKANE - SULPHONAMIDO SUBSTITUTED ORGANO-SILICON COMPOUNDS AND THEIR PRODUCTION
Hans Joachim Lucking, Bergisch-Neukirchen, Walter Noll, Opladen, Werner Buchner, Leichlingen, Klaus Friederich, Leverkusen, and Hans Niederprum, Monheim, Rhineland, Germany, assignors to Bayer Aktiengesellschaft, Leverkusen, Germany
No Drawing. Filed Jan. 25, 1972, Ser. No. 220,689
Claims priority, application Germany, Jan. 18, 1971, P 21 07 758.7
Int. Cl. C07f 7/18
U.S. Cl. 260—448.8 R         4 Claims

ABSTRACT OF THE DISCLOSURE

Novel organo-oxysilanes and organo-polysiloxanes having at least one Si-bonded substituent of the general formula

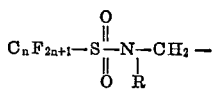

wherein $n$ is an integer from 1 to 18 and R is a hydrogen atom or a hydrocarbon radical are produced by reacting a halomethyl organo-oxy silane or a halomethyl-substituted organo-polysiloxane with a perfluoro-alkane-sulphonamide of the general formula

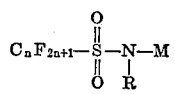

in which M is a hydrogen atom or an alkali metal atom, at a temperature of between 20 and 200° C., and in the case where M is a hydrogen atom in the presence of a tertiary nitrogen base.

The products are suitable as oil-, dirt- and water-repellent coating agents.

---

The present invention relates to new organo-silicon compounds, and in particular to such compounds having the characteristic atom sequence

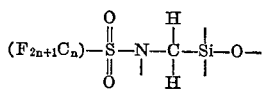

The invention also relates to processes for their production. These compounds are suitable for coating or impregnating such materials as, for example, glass, stone, wood, natural and synthetic fibers, paper and leather, in order to impart an oil-, dirt- and water-repellent surface thereto.

The organo-silicon compounds according to the invention consist of at least one structural unit of the general formula

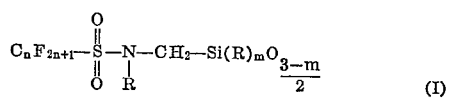 (I)

and at least $(3-m)$ further structural units each of which individually corresponds either to the above General Formula I or to one of the general formulae

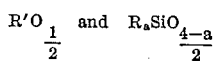

In these formulae, as well as in all following formulae,
R is a hydrogen atom or a hydrocarbon radical;
R' is a hydrocarbon radical, preferably an alkyl radical having 1 to 4 carbon atoms;
$n$ is an integer from 1 to 18, preferably from 3 to 12;
$m$ is 0, 1 or 2; and
$a$ is 1, 2 or 3, these radicals and numbers being chosen independently of one another in each position of a molecule.

Also according to the invention, a process for preparing these perfluoro-alkane-sulphonamido-methyl-siloxyl compounds comprises reacting a halomethyl-siloxyl compound consisting of at least one structural unit of the general formula

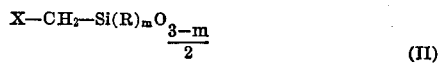 (II)

in which X is a chlorine, bromine or iodine atom, and at least $(3-m)$ further structural units each of which individually corresponds to the above General Formula II or to one of the formulae

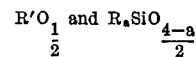

with a perfluoro-alkane-sulphonamide of the general formula

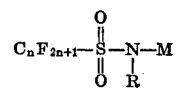

in which M is a hdrogen atom or an alkali metal atom, at a temperature of between 20 and 200° C., preferably between 50 and 170° C., and in the case where M is a hydrogen atom in the presence of at least a stoichiometrically equivalent amount of a tertiary nitrogen base.

It is not necessary to carry out this reaction in the presence of an inert solvent, e.g. in benzene, toluene, xylene, acetonitrile or ethanol, but it is usually advantageous so to do, in order to facilitate the separation of the halogen salt which is formed in the reaction and which is most simply removed by filtration. The desired product is normally obtained from the filtrate by distillation under reduced pressure.

The perfluoroalkyl radicals $C_nF_{2n+1}$ may be linear or branched; examples are perfluoro-n-butyl, perfluoro-hexyl and perfluoro-octyl.

The N-bound hydrocarbon radicals R are preferably lower, optionally branched alkyl or alkenyl radicals with 1 to 5 carbon atoms; for example methyl, ethyl, propyl, butyl or allyl.

The Si-bound hydrocarbon radicals R are preferably methyl, vinyl or phenyl.

The proportion of the reaction components is not critical for the process; but it should be borne in mind that in the case of an excess of the halomethyl-silicon compound, part of the Si-bound halomethyl radicals remain unchanged and that in those cases where the N-bound R is a hydrogen atom, disubstitutions occur at the nitrogen atom. If both occurrences are to be obviated, it is therefore advisable to use stoichiometrically equivalent amounts, if only because this makes it easier to obtain the reaction products in a pure state.

Those of the products according to the invention which contain structural units of the general formula $R'O_{1/2}$ can be further reacted, either by themselves (uniformly or mixed) or in mixture with other hydrolyzable silane derivatives, for example with methyl-chloro-, methyl-alkoxy-, methyl-hydrogen-chloro-, methyl-hydrogen-alkoxy-, methyl-vinyl-chloro-, methyl - vinyl - alkoxy-, phenyl-chloro-, phenyl-alkoxy-, phenyl-methyl-chloro-, phenyl-methyl-alkoxy-silanes, according to known methods by hydrolysis and condensation to form the corresponding siloxanes which are also part of the invention.

Such hydrolysis products can also be treated according to known methods for "equilibration," in order to produce copolymeric siloxanes of the type according to the invention.

Compounds which are analogous with the products defined above and contain more than a single carbon atom between the nitrogen and the silicon atoms are known and are prepared by the addition of H—Si compounds, for example alkyl-hydrogen-silicon halides, on to N-(alkenyl)-perfluoro-alkane-sulphonamides. These addition processes, however, have some disadvantages: they require platinum-containing catalysts which are costly, expensive to prepare and can usually not be regenerated. To prepare the products on a large scale, a process carried out batchwise proves unsuitable, because the addition reaction generates so much heat within a short time that the reaction cannot be controlled by cooling and the rise in temperature leads to a decomposition of the reaction material. It is therefore necessary to use a continuous process with substantially more elaborate devices and at considerably higher technical expenditure for measuring and control, compared with a stirring vessel.

These disadvantages of the addition processes are obviated by using instead the substitution process according to the invention. The surprising feature of this process is that the reactivity of the hydrogen atom linked to the amide nitrogen atom of the perfluoroalkane-sulphonamides is sufficiently high to enable a N-alkylation with halomethyl-silicon compounds to take place; according to known experiences with the reaction properties of fluorine-free alkyl- and aryl-sulphonamides, such a reactivity was not to be expected.

The following examples are given for the purpose of illustrating the invention.

EXAMPLE 1

A mixture of 340 g. N-(methyl)-perfluoro-n-butyl-sulphonamide, 253 g. methyl-(bromomethyl)-diethoxy-silane, 200 g. triethylamine and 250 g. of anhydrius acetonitrile is heated with stirring at 80° C. for 4 hours. When the reaction mixture has cooled down, 350 cc. ether are added, and the mixture is allowed to stand for several hours, and then filtered off from the precipitated triethylamine hydrobromide in a nitrogen atmosphere. The filtrate is distilled under reduced pressure, and at 0.2 mm. Hg and between 75 and 77° C. there are obtained 400 g. of a fraction (85% of the theoretical amount) which can be identified by the infra-red spectrum and the nuclear magnetic resonance spectrum as N-methyl-N-(methyl-di-ethoxy-silyl-methyl)-perfluoro - n - butyl-sulphonamide corresponding to the formula

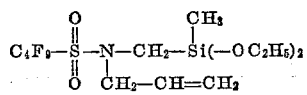

EXAMPLE 2

A solution of 181 g. N-(allyl)-perfluoro-n-butyl-sulphonamide, 136 g. methyl-(bromomethyl)-diethoxy-silane and 110 g. triethylamine in 400 g. of anhydrous N,N-dimethyl formamide is heated with stirring at 80° C. for 4 hours. When the reaction mixture has cooled down, 400 cc. ether are added, and the mixture is allowed to stand for several hours and then filtered off from the precipitated triethylamine hydrobromide in a nitrogen atmosphere. The filtrate is distilled under reduced pressure, and at 0.05 mm. Hg and 80° C. there are obtained 236 g. of a fraction (82% of the theoretical amount) which can be identified by the infra-red spectrum and the nuclear magnetic resonance spectrum as N-allyl-N-(methyl-diethoxysilyl-methyl)-perfluoro-n-butyl-sulphonamide corresponding to the formula

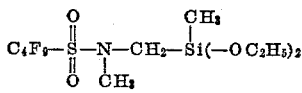

EXAMPLE 3

A solution of 144 g. N-(methyl)-perfluoro-n-butyl-sulphonamide, 73.6 g. 1,3-di-(bromomethyl)-tetramethyl-disiloxane and 51 g. triethylamine in 250 cc. toluene is heated at 110° C. for 5 hours. When the reaction mixture has cooled down, the precipitated triethylamine hydrobromide is filtered off and the filtrate is distilled under reduced pressure. After evaporation of the solvent, there is obtaine at 0.6 mm. Hg and between 140 and 165° C. a fraction of 148 g. (82% of the theoretical amount) of a clear oil which crystallizes in the cold and can be identified by elementary analysis, infra-red spectrum and nuclear magnetic resonance spectrum as 1,3-di-[N-(methyl)-perfluoro-n-butyl-sulphonamido-methyl] - tetramethyl-disiloxane corresponding to the formula

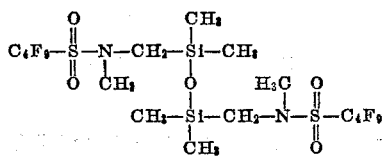

EXAMPLE 4

A solution of 400 g. N-(methyl)-perfluoro-octyl-sulphonamide, 187 g. methyl-(bromomethyl)-diethoxy-silane and 85 g. triethylamine in 800 cc. acetonitrile is heated at 110° C. for 8 hours. When the reaction mixture has cooled down, the precipitated triethylamine hydrobromide is filtered off and the filtrate is distilled under reduced pressure. After evaporation of the solvent, there is obtained at 0.6 mm. Hg and between 118 and 122° C. a fraction of 443 g. (86.5% of the theoretical amount) of a clear liquid which can be identified by the infra-red spectrum and the nuclear magnetic resonance spectrum as N-methyl-N-(methyl-diethoxysilyl-methyl) - perfluoro - octyl-sulphonamide corresponding to the formula

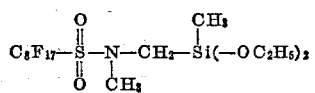

EXAMPLE 5

A solution of 156.5 g. N-(methyl)-perfluoro-n-butyl-sulphonamide, 91.3 g. methyl-(chloromethyl)-diethoxy-silane and 55.5 g. triethylamine in 250 cc. toluene is heated at 90 to 100° C. for 10 hours. When the reaction mixture has cooled down, the precipitated triethylamine hydrochloride is filtered off and the filtrate is distilled under reduced pressure. After evaporation of the solvent, there is obtained at 0.35 mm. Hg and 87° C. a fraction of 188.2 g. (82% of the theoretical amount) of a clear liquid which can be identified by the infra-red spectrum and the nuclear magnetic resonance spectrum as N-methyl-N-(methyl-diethoxysilyl-methyl) - perfluoro - n - butyl-sulphonamide, as also obtained according to Example 1.

EXAMPLE 6

A mixture of 50 g. N-(sodium)-perfluoro-n-butyl-sulphonamide, 42.5 g. methyl-(iodomethyl)-diethoxy-silane and 100 cc. acetonitrile is heated with stirring at 70° C. for 6 hours. When the reaction mixture has cooled down, the precipitated sodium iodide is filtered off and the filtrate is distilled under reduced pressure. After evaporation of the solvent, there is obtained at 0.2 mm. Hg and between 70 and 72° C. a fraction of 53.8 g. (78% of the theoretical amount) of a clear liquid which can be identified by the infra-red spectrum and the nuclear magnetic resonance spectrum as N-(methyl-diethoxysilyl-methyl)-perfluoro-n-butyl-sulphonamide corresponding to the formula

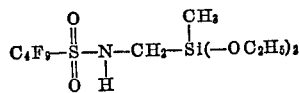

What we claim is:

1. A perfluoroalkane-sulfonamide-methyl alkoxy-silane of the general formula

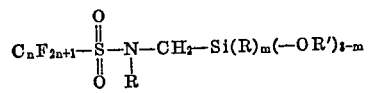

in which R is selected from the group consisting of hydrogen, a saturated hydrocarbon or an olefinic hydrocarbon having between 1 and 5 carbon atoms and phenyl; R' is an alkyl radical having 1 to 4 carbon atoms; $n$ is an integer from 1 to 18; and $m$ is 0, 1 or 2, each of these radicals being chosen independently of one another in each position of the molecule.

2. Compound according to claim 1 wherein $n$ is an integer from 3 to 12.

3. Compound according to claim 1 wherein each of the N-bound radicals R is an aliphatic hydrocarbon radical having 1 to 5 carbon atoms, selected from the group consisting of alkyl and alkenyl.

4. Compound according to claim 1 wherein each of the Si-bound hydrocarbon radicals R is selected from the group consisting of methyl, vinyl and phenyl.

References Cited

UNITED STATES PATENTS

| | | | |
|---|---|---|---|
| 3,328,449 | 6/1967 | Haluska | 260—448.2 N |
| 3,483,241 | 12/1969 | Berger | 260—448.2 N |
| 3,646,085 | 2/1972 | Bartlett | 260—448.8 R |

OTHER REFERENCES

Johnston et al.: J.A.C.S., 36, pp. 379 and 382, 1916.

DANIEL E. WYMAN, Primary Examiner

P. F. SHAVER, Assistant Examiner

U.S. Cl. X.R.

106—12, 13, 287 SB; 117—124 F, 142, 147, 154; 260—448.2 E, 448.2 N

PO-1050
(5/69)

UNITED STATES PATENT OFFICE
CERTIFICATE OF CORRECTION

Patent No. 3,787,467　　　　　　　　Dated January 22, 1974

Inventor(s) HANS JOACHIM LÜCKING et al

It is certified that error appears in the above-identified patent and that said Letters Patent are hereby corrected as shown below:

Column 1, after the title, inventors' names: "Lucking" should be -- Lücking --; "Buchner" should be -- Büchner --; "Niederprum" should be -- Niederprüm --. After "Niederprum" "Monheim, Rhineland" should be -- Monheim/Rhineland --. Priority date claimed should be changed from "January 18, 1971" to February 18, 1971 --.

Column 2, line 46, "perfluoro-n-butyl" should read --perfluoro-n-butyl --.

Column 3, line 40, "perfluoro-n-butyl" should read --perfluoro-n-butyl --; line 63, "perfluoro-n-butyl" should read --perfluoro-n-butyl --.

Column 4, line 21, "perfluoro-n-butyl" should read -- perfluoro-n-butyl --; line 62, "perfluoro-n-butyl" should read -- perfluoro-n-butyl --; line 66, "perfluoro-n-butyl" should read -- perfluoro-n-butyl --.

Column 5, line 2, "perfluoro-n-butyl" should read -- perfluoro-n-butyl --.

Signed and sealed this 8th day of October 1974.

(SEAL)
Attest:

McCOY M. GIBSON JR.　　　　　　　　C. MARSHALL DANN
Attesting Officer　　　　　　　　　Commissioner of Patents